United States Patent [19]

Martin et al.

[11] 4,266,772
[45] * May 12, 1981

[54] SOLID GOLF BALL

[75] Inventors: Frank S. Martin, Cranston; Terence Melvin, Kingstown; Joseph K. Pieroni, Providence, all of R.I.

[73] Assignee: Uniroyal, Inc., New York, N.Y.

[ * ] Notice: The portion of the term of this patent subsequent to Apr. 4, 1995, has been disclaimed.

[21] Appl. No.: 284,303

[22] Filed: Aug. 28, 1972

[51] Int. Cl.$^3$ .......................... A63B 37/00; C08L 9/00
[52] U.S. Cl. ................................ 273/218; 260/42.32; 260/998.14; 273/DIG. 10; 525/274
[58] Field of Search ....................... 273/218, DIG. 10; 260/998.14, 42.32; 525/274

[56] References Cited

U.S. PATENT DOCUMENTS

| | | | |
|---|---|---|---|
| 3,313,545 | 4/1967 | Bartsch | 273/218 |
| 3,421,766 | 1/1969 | Chmiel et al. | 273/218 |

*Primary Examiner*—Allan Lieberman
*Attorney, Agent, or Firm*—James J. Long

[57] ABSTRACT

Solid golf balls, characterized by high initial velocity as well as outstanding retention of properties on continued hitting, are made from a blend of a resilient elastomer (e.g., cis-polybutadiene) and zinc oxide-methacrylic acid reaction product, the composition being cured with a free-radical cross-linking agent such as peroxide.

10 Claims, No Drawings

SOLID GOLF BALL

This invention relates to a solid golf ball.

In recent years much progress has been made in the field of solid golf balls, that is, unitary integral golf balls made from a single homogeneous composition throughout, as opposed to the traditional wound golf ball which has a more complex structure. U.S. Pat. Nos. 3,238,156, Kohrn, Mar. 1, 1966 and 3,421,766, Chmiel et al, Jan. 14, 1969 are representative prior disclosures in the solid golf ball art.

Prior art teachings on solid golf balls have aimed at attempting to approximate or duplicate as closely as feasible many of the desirable characteristics or specifications for wound golf balls, but it has been desired to achieve further improvements or economies, and, in particular, it has been desired to provide a more resilient golf ball without sacrifice of durability, and to reduce the effects of play on ball characteristics. For example, the usual solid golf ball has had an initial velocity of about 240 feet per second as compared to 248 to 255 feet per second for good wound balls. Some solid golf balls have given higher initial velocities, but they have been of questionable durability and did not closely approximate the flight performance of good wound balls.

In accordance with the invention an improved unit construction solid golf ball is provided, made of a crosslinked blend of a resilient elastomer with a zinc oxide-methacrylic acid reaction product. While it is not desired to limit the invention to any particular theory of operation, it is believed that the function of the zinc oxide-methacrylic acid reaction product in the crosslinked composition is to contribute to the hardness without undue sacrifice of the resilience conferred by the elastomer.

In practicing the invention the molar ratio of zinc oxide to methacrylic acid monomer employed in making the zinc oxide-methacrylic acid reaction product is usually at least 0.5 to 1. The reaction product is preferably pre-formed prior to blending with the elastomer. Preferably approximately equimolar quantities of the zinc oxide and methacrylic acid (i.e., approximately two equivalents of zinc oxide per equivalent of methacrylic acid, which would be the proportions required for basic zinc methacrylate) are employed in preparing the reaction product, but other proportions, e.g. 0.5 to 1.5 moles of zinc oxide per mole of methacrylic acid (1 to 3 equivalents of zinc oxide per equivalent of methacrylic acid) may be used. A zinc oxide: methacrylic acid ratio corresponding to normal zinc methacrylate may be used but does not give as desirable a result as the ratio corresponding to the basic salt. An excess of zinc oxide simply acts as an added filler, but an excess of methacrylic acid should be avoided. An excess of methacrylic acid not only gives an inferior product but it is very hazardous and difficult to handle.

To prepare the reaction product the zinc oxide and methacrylic acid are preferably brought together in a liquid medium which aids in dissipating the heat that is liberated by exothermic reaction of the two materials. For this purpose water may be used, or a volatile organic liquid, such as a hydrocarbon liquid or an alkanol or other convenient inert solvent medium. Preferably the zinc oxide is dispersed in the liquid medium and the methacrylic acid is added to the dispersion, while agitating. As a dispersing aid, a small amount of precipitated hydrated silica is optionally present (e.g., 5–10% of silica based on the weight of the zinc oxide). The materials may be pre-cooled (e.g., to 0° C.) to serve as a heat sink, but this is not essential. As the reaction draws to a completion the reaction mixture ordinarily thickens or gels and typically turns to the consistency of thin plaster. Evaporation of the solvent yields the zinc oxide-methacrylic acid reaction product in solid form, which is ground up for use in the invention. To achieve the desired properties in the golf ball it is preferable that the zinc oxide-methacrylic acid reaction product be finely powdered, at least to a fineness sufficient to pass a 200 mesh sieve, preferably a 270 mesh sieve (U.S. sieve series), or finer. Larger particle size material, e.g. 40 mesh, may be used but tends to be less efficient, particularly unless broken down considerably during blending with the elastomer.

In place of preforming the zinc oxide-methacrylic acid reaction product prior to blending with the elastomer, it is possible to prepare the zinc oxide-methacrylic acid reaction product in situ in the elastomer, for example by adding zinc oxide and methacrylic acid (preferably in that order) to the elastomer in a Banbury mixer. Combinations of the preforming and in situ method may be used, for example by preforming a powdered zinc oxide-methacrylic acid reaction product using less that the total amount of zinc oxide (e.g., prereact ½ mole of zinc oxide and 1 mole of methacrylic acid, these being the proportions required for normal zinc methacrylic), and combining this powder and the remainder of the zinc oxide (e.g. another ½ mole of zinc oxide, to give the proportions required for basic zinc methacrylate) with the elastomer in a Banbury mixer. The preforming procedure avoids the hazard and inconvenience of obnoxious methacrylic acid fumes being given off in the Banbury, and gives more reproducible results. Methacrylic acid is rather volatile and not very soluble in the rubber. Therefore varying amounts may be lost during the mixing. Enclosing the mixer minimizes the difficulties, but is not always convenient or economical.

The resilient elastomer with which the zinc oxide-methacrylic acid reaction product is blended is suitably a free-radical crosslinkable elastomer, especially a peroxide-crosslinkable elastomer, usually an unsaturated elastomer, preferably a diene rubber, notably polybutadiene, particularly polybutadiene having a high content (viz., 50% or more, preferably at least 80%, more preferably at least 95%) of cis-1,4 structure. The zinc oxide-methacrylic acid reaction product is blended with the elastomer in conventional rubber mixing equipment, such as an internal mixer of the Banbury type or on an open roll mill, along with any other suitable desired modifying ingredients. Usually from about 10 to about 60 parts, preferably about 25 to about 45 parts, of zinc oxide-methacrylic acid reaction product are employed per 100 parts by weight of elastomer.

The composition further contains, as a cross-linking or curing agent, a souce of free radicals such as a peroxide, hydroperoxide, azo compound, or the like, or radiation such as ionizing radiation or ultra violet light may be used as the source of free radicals. There may be mentioned as suitable for this purpose such free radical curatives as dicumyl peroxide, lauroyl peroxide, benzoyl peroxide, 2,4-dichlorobenzoyl peroxide, 2,5-dimethyl-2,4-di(t-butylperoxy) hexane, n-butyl-4,4-bis(t-butylperoxy) valerate, t-butylhydroperoxide, azobisisobutyronitrile, etc. The composition is shaped into the form of a golf ball, for example by compression or injection molding in a golf ball mold, and the shaped composition is heated at a temperature sufficient to decompose the free-radical generating agent, for a time sufficient to bring about cure. When using n-butyl-4,4-bis(t-butylperoxy) valerate as the peroxide curative, a curing temperature of about 300° F. is the most desirable. Over-curing is undesirable and under-cure does not produce a good ball. Those skilled in the art of free radical curing agents for polymers know how to adjust the cure time and temperature to obtain optimum results from any specific free radical agent. While it is not desired to limit the invention to any particular theory of operation, it appears to be possible that the zinc oxide-methacrylic acid reaction product becomes polymerized, possibly at least in part by graft copolymerization onto the elastomer, during the curing step. In any case, the elastomer becomes cross-linked during the cure.

Other ingredients may be present in the composition. Thus, an ionomer (see U.S. Pat. No. 3,421,766 referred to above, column 2 line 18 to column 3 line 5 for a disclosure of ionomers useful herein) may be admixed with the golf ball composition, for example in amount of 5 to 30 parts per 100 parts by weight of the elastomer, especially as an aid to better processing, including smoother extrusion and better molding of the golf ball. Such ionomer may be described as an ionic copolymer of at least 50 mole percent of one or more alpha-olefins together with a lesser amount of alpha, beta ethylenically unsaturated monocarboxylic acid or dicarboxylic acid, the acid monomer content of said copolymer being from 0.2 to 25 mole percent, said copolymer containing uniformly distrubted throughout the copolymer a metal ion having an ionized valence of 1 to 3 inclusive in monocarboxylic acid containing ionomers and a valence of 1 in dicarboxylic acid-containing ionomers. At least 10% (preferably at least about 30%) of the carboxylic acid groups of the copolymer are neutralized by the metal ions and exist in the ionic state. Ionomers based on copolymers of ethylene and acrylic or methacrylic acid are most common. The metal ions are commonly ions of Groups I, II, III, IV-A and VIII of the periodic table, the more common ones being ions of the alkali metals such as sodium and potassium, and the alkaline earth metals such as calcium, strontium, barium and such commonly available metals as zinc and aluminum. The ionomers are hard, transparent, resinous thermoplastic materials. (See Canadian Pat. Nos. 674,595, Nov. 19, 1963 and 713,631, July 13, 1965; also "Polymer Preprints, A.C.S., Division of Polymer Chemistry, April 1965", Vol. 6, No. 1, pages 287–303).

Other materials such as reinforcing fillers may also be added, for example litharge or zinc oxide in amount of for example 2 to 10 parts per 100 parts of elastomer, particularly for the purpose of increasing the hardness. Useful variations include the possibility of lowering the zinc oxide-methacrylic acid reaction product content of the composition and adding filler to get a golf ball of proper weight with a lower volume loading and better initial velocity properties. Other compounding variations may be employed. For example, impact modifiers such as high molecular weight polyethylene as described in U.S. Pat. No. 3,478,132, Randolph, Nov. 11, 1969, may be added.

The golf ball of the invention may have the usual patterned or dimpled surface, imparted during the molding operation.

Preferred golf balls of the invention have the hardness or compression, and weight required of standard golf balls, and have superior rebound, initial velocity as the ball leaves the club and click to previous solid balls, and in addition they are remarkably durable. They have the surprising ability to retain their original qualities and structural integrity even after being struck repeatedly. Outstanding performance in flight is another important advantage of golf balls of the invention.

The composition from which the golf ball of the invention is made has desirable properties which suggest its use for many other things, for example, solid tires.

The following examples, in which all quantities are expressed by weight, will serve to illustrate the practice of the invention in more detail.

EXAMPLE I

To 100 parts of commercial methanol is added 10 parts of Hi Sil (trademark; precipitated hydrated silica; optional) and 100 parts of zinc oxide to produce a slurry. While agitating the slurry at room temperature, 100 parts of methacrylic acid (mole ratio of zinc oxide to methacrylic acid 1:0.945), also at room temperature, is added. The temperature gradually rises spontaneously, without noticeable thickening of the mixture, to about 60° C. The temperature then subsides, but thereafter the mixture begins to thicken and the temperature rises again to about 50° C. When about 15 minutes have elapsed from the initial mixing the mix has thickened to the consistency of thin plaster and is poured into a tray to cool and solidify, with evaporation of the methanol. The reaction product is then ground to a fineness such as to pass a 325 mesh sieve. The ratio of zinc to methacrylate groups in the product corresponds approximately to the ratio required by "basic zinc methacrylate" (i.e., the product analyzes about 1 mole of methacrylic acid for each mole of zinc).

The following mix is prepared on a rubber mill:

|  | Parts |
| --- | --- |
| Cis-polybutadiene (Mitsui BROI; cis content 97%) | 100 |
| Zinc oxide-methacrylic acid reaction product | 45 |
| Peroxide curative | 5 |

The peroxide curative is "Luperco (trademark) 230 XL", which contains 50% n-butyl-4,4-bis(t-butylperoxy) valerate with an inert filler. The mix is extruded and cut into biscuits, which are placed in golf ball molds and cured for 20 minutes at 300° F. under presure as is customary for solid golf balls. The resulting balls have a PGA hardness of 85, a rebound of 77 inches, an initial velocity of 247 feet per second on the standard USGA initial velocity tester, and a weight of 1.61 oz. When struck the balls have excellent "click". They may be painted with a white paint or any other desired coating. The balls are subjected to a durability test in a hitting machine which repeatedly hits the ball with a hard blow until failure occurs. After 75 hits (approximately equivalent to 750 hits with a driver) the ball properties (rebound and compression) are substantially unchanged!

EXAMPLE II

A golf ball is prepared from following composition:

|  | Parts |
| --- | --- |
| Cis-polybutadiene (Mitsui BROI) | 100 |
| Zinc oxide-methacrylic acid reaction product (prepared as in | |

| | Parts |
|---|---|
| Example I) | 45 |
| Ionomer | 20 |
| Curative (Luperco 230 XL) | 5 |

The ionomer may be an ionic copolymer of approximately 96.5 mole-percent of ethylene and 3.5 mole-percent of methacrylic acid with sodium ions uniformly distributed throughout the copolymer to an extent representing about 50% neutralization of the methacrylic acid (ASTM melt index of 10), as represented for example by such commercially available materials as "Surlyn (trademark) A 1555". This composition gives a hardness of 71 Shore C when cured 20 minutes at 300° F. When cured 20 minutes at 320° F. the composition gives a ball having a PGA hardness of 77 with a rebound of 77½ inches.

Addition of 5 parts of litharge to the formulation of Example II increases the Shore C hardness to 75, after a 20 minute cure at 300° F.

Cis-polybutadiene gives greater hardness and better resilience as well as a tougher compound as compared with other elastomers. Thus, substitution of synthetic polyisoprene (Natsyn [trademark]) or neoprene for the cis-polybutadiene of Example I gives Shore C hardness of about 47 and 35, respectively, when cured in admixture with 45 parts of the zinc oxide-methacrylic acid reaction product. Diene 35 NFA (trademark) polybutadiene with 30 parts of zinc oxide-methacrylic acid gives a ball having a PGA hardness of 62 but a rebound of only 68. Although these properties are less than optimum, such modifications are adequate for applications other than solid golf balls or for solid golf balls that are not required to conform as closely as feasible to the performance characteristics of a good wound ball. Less preferably, other peroxide-crosslinkable resilient elastomers such as polyurethanes may be used.

We claim:

1. An integral unitary solid golf ball which approximates performance characteristics of a standard wound golf ball, and retains said characteristics after extended play, made of a composition comprising, by weight, 100 parts of a resilient cis-polybutadiene elastomer having at least 50% of cis-1,4 structure and 10 to 60 parts of preformed zinc oxide-methacrylic acid reaction product in proportions of approximately 1 to 1.5 moles of zinc oxide per mole of methacrylic acid, the said composition being cured with a free-radical generating curing agent, the said preformed zinc oxide-methacrylic acid reaction product being in finely powdered form such as to pass a 200 mesh sieve.

2. A golf ball as in claim 1 in which the composition further contains 5 to 30 parts of an ionomer which is a copolymer of ethylene and 1.0 to 25 mole percent of units derived from an alpha,beta-ethylenically unsaturated mono- or di-caboxylic acid, with at least 10 percent of the acid groups being neutralized by metal ions having a valence of 1 to 3 when the acid is monocarboxylic and a valence of 1 when the acid is dicarboxylic.

3. A golf ball as in claim 1 in which the composition further contains 2 to 10 parts of litharge.

4. A golf ball as in claim 1 in which the zinc oxide-methacrylic acid reaction product is in finely powdered form such as to pass a 270 mesh sieve.

5. A golf ball as in claim 1 in which the free-radical generating curing agent is n-butyl-4,4-bis(t-butylperoxy) valerate.

6. A golf ball as in claim 1 in which the said reaction product is made by bringing zinc oxide and methacrylic acid monomer together in a liquid medium which serves to dissipate the exothermic heat of reaction which is generated.

7. A golf ball as in claim 6 in which the said liquid medium is methanol.

8. A golf ball as in claim 6 in which the said liquid medium is water.

9. A golf ball as in claim 7 or 8 in which the methacrylic acid is added to a slurry of the zinc oxide in methanol or water, with agitation.

10. A composition comprising, by weight, 100 parts of a resilient cis-polybutadiene elastomer having at least 50% of cis-1,4 structure and 10 to 60 parts of preformed zinc oxide-methacrylic acid reaction product in proportions of approximately 1 to 1.5 moles of zinc oxide per mole of methacrylic acid the said composition being cured with a free-radical generating curing agent, the said reaction product being made by bringing zinc oxide and methacrylic acid monomer together in a liquid medium which serves to dissipate the exothermic heat of reaction which is generated, the said liquid medium being methanol or water, and the methacrylic acid being added to a slurry of the zinc oxide in said methanol or water, with agitation.

* * * * *